US008689262B2

(12) United States Patent
Yamamura et al.

(10) Patent No.: US 8,689,262 B2
(45) Date of Patent: Apr. 1, 2014

(54) BROADCAST RECEIVING DEVICE

(75) Inventors: Toshiki Yamamura, Osaka (JP); Junji Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 1299 days.

(21) Appl. No.: 12/066,807

(22) PCT Filed: Sep. 21, 2006

(86) PCT No.: PCT/JP2006/318699
§ 371 (c)(1),
(2), (4) Date: Mar. 13, 2008

(87) PCT Pub. No.: WO2007/040054
PCT Pub. Date: Apr. 12, 2007

(65) Prior Publication Data
US 2009/0322964 A1 Dec. 31, 2009

(30) Foreign Application Priority Data

Sep. 30, 2005 (JP) .................. 2005-289097

(51) Int. Cl.
*G06F 3/00* (2006.01)
*G06F 13/00* (2006.01)
*H04N 5/445* (2011.01)
*H04N 5/50* (2006.01)
*H04N 9/80* (2006.01)

(52) U.S. Cl.
USPC ............ 725/58; 725/37; 725/57; 725/59; 725/68; 725/100; 348/731; 348/732; 348/735; 386/239; 386/248

(58) Field of Classification Search
USPC ............ 348/731, 732, 735; 725/68, 85, 100, 725/131, 139, 151, 37, 57–59; 386/239, 386/248
See application file for complete search history.

(56) References Cited

U.S. PATENT DOCUMENTS 4,998,292 A 3/1991 Eigeldinger et al.
5,575,000 A 11/1996 Park et al.
(Continued)

FOREIGN PATENT DOCUMENTS

JP 9-083534 3/1997
JP 2758174 3/1998
(Continued)

OTHER PUBLICATIONS

International Search Report issued Nov. 21, 2006 in the International (PCT) Application of which the present application is the U.S. National Stage.

(Continued)

*Primary Examiner* — Pankaj Kumar
*Assistant Examiner* — Alazar Tilahun
(74) *Attorney, Agent, or Firm* — Wenderoth, Lind & Ponack, L.L.P.

(57) ABSTRACT

A broadcast receiving device capable of easily setting area information. A control unit of a DVR transmits an acquisition request for area information to a TV. When the control unit receives a response to the acquisition request from the TV, the control unit extracts area information from the received response and performs a channel presetting using the extracted area information. A control unit of the TV has area information stored therein. When the control unit receives an acquisition request for area information from the DVR, the control unit transmits, as a response to the request, the stored area information to the DVR.

19 Claims, 9 Drawing Sheets

(56) References Cited

U.S. PATENT DOCUMENTS

| | | | |
|---|---|---|---|
| 6,388,714 B1* | 5/2002 | Schein et al. | 348/563 |
| 6,850,286 B2* | 2/2005 | Burghard | 348/732 |
| 6,895,017 B2 | 5/2005 | Kitamura | |
| 2001/0022630 A1* | 9/2001 | Nakagawa et al. | 348/730 |
| 2002/0088006 A1* | 7/2002 | Yotsumoto et al. | 725/131 |
| 2005/0030973 A1 | 2/2005 | Kitamura | |

FOREIGN PATENT DOCUMENTS

| | | |
|---|---|---|
| JP | 10-257402 | 9/1998 |
| JP | 11-146426 | 5/1999 |
| JP | 2001-197384 | 7/2001 |
| JP | 2001-237729 | 8/2001 |
| JP | 2001-285737 | 10/2001 |
| JP | 2002-77223 | 3/2002 |
| JP | 2002-185931 | 6/2002 |
| JP | 2003-023576 | 1/2003 |
| JP | 2003-298653 | 10/2003 |
| JP | 2003-308263 | 10/2003 |
| JP | 2004-228788 | 8/2004 |
| JP | 2004-350100 | 12/2004 |
| JP | 2005-109637 | 4/2005 |

OTHER PUBLICATIONS

Full machine translation of Japanese Patent Application Publication No. 9-83534, published Mar. 28, 1997.
Full machine translation of Japanese Patent Application Publication No. 2003-298653, published Oct. 17, 2003.

* cited by examiner

BROADCAST RECEIVING DEVICE

BACKGROUND OF THE INVENTION

The invention relates to a broadcast receiving device that receives a broadcast and, more particularly, to a technique of setting area information on a terrestrial digital broadcast receiving device that receives a terrestrial digital broadcast.

In recent years, terrestrial digital broadcast receiving devices that receive terrestrial digital broadcasts, such as TVs and DVRs (Digital Video Recorders) such as DVD recorders, have become widespread.

When a terrestrial digital broadcast receiving device is newly installed or when the place of residence is changed due to moving or the like, a setting needs to be made according to each individual use environment or the like. To reduce trouble caused to a user associated with such a setting, the common terrestrial digital broadcast receiving device has a presetting function that automatically registers channels which are channels to be selected. Channel registration is meant to assign channels to channel selection buttons from 1 to 12, for example, on a remote controller and store the channels.

To perform such a channel presetting, area information needs to be set in advance. The area information is information indicating an area, such as a zip code, a prefecture, or an area code. A user directly inputs area information or selects an appropriate area from a selection screen, through a GUI of a terrestrial digital broadcast receiving device.

Thus, a user possessing a plurality of terrestrial digital broadcast receiving devices need to set area information each time a device is added. In addition, when the place of residence is changed due to moving or the like, the user needs to reset the area information on all the terrestrial digital broadcast receiving devices that the user possesses. Furthermore, if wrong information is inputted when directly inputting area information or if a wrong area is selected when selecting an appropriate area from a selection screen, there is a problem, for example, that only a particular terrestrial digital broadcast receiving device has a different setting content than other terrestrial digital broadcast receiving devices.

Japanese Laid-Open Patent Application No. 2004-350100 proposes a method for avoiding such problems.

Specifically, a server that can be connected to an external network is installed and an infrared device that receives information, such as area information, through the server is installed. The infrared device makes a setting or modification of area information on devices, each having an infrared receiving unit mounted thereon, such as a TV and a VCR.

The above-described method disclosed in Japanese Laid-Open Patent Application No. 2004-350100, however, requires an information provider such as an Internet provider. In addition, devices other than a TV and a VCR, such as a server for external network connection and an infrared device for transmitting information, are required.

SUMMARY OF THE INVENTION

The invention has been made in view of such problems and provides a broadcast receiving device capable of easily setting area information.

In order to achieve a broadcast receiving device capable of easily setting area information, the broadcast receiving device (e.g., a DVR) that receives a broadcast includes: a request transmission unit which transmits, to an external device, an acquisition request for area information which is information indicating an area; a response receiving unit which receives a response to the acquisition request from the external device; an extraction unit which extracts the area information from the received response; and a presetting unit which presets a channel using the extracted area information. By this, when a response to the acquisition request is received from an external device, it becomes possible to perform channel presetting using area information included in the response.

Here, the broadcast receiving device may further include a storage unit which stores the extracted area information, wherein the request transmission unit transmits the acquisition request to the external device when the area information is not stored in the storage unit or when an update to the area information is instructed by a user. By this, only when the area information is not stored in the storage unit or only when an update to the area information is instructed by the user, a channel presetting is performed.

On the other hand, a broadcast receiving device (e.g., a TV) that receives a broadcast includes: a storage unit which stores area information which is information indicating an area; a request receiving unit which receives an acquisition request for the area information from an external device; and a response transmission unit which transmits, as a response to the acquisition request, the area information stored in the storage unit to the external device. By this, when a device receives an acquisition request for area information from an external device, it becomes possible for the device to transmit a response including area information set on the device, to the external device.

Alternatively, a broadcast receiving device (e.g., a TV) that receives a broadcast includes: a storage unit which stores area information which is information indicating an area; and an update notification transmission unit which transmits, as an update notification of the area information, the area information stored in the storage unit to an external device. By this, when area information on a device is newly set, it becomes possible for the device to transmit update notification including the area information to an external device.

Here, the update notification transmission unit may transmit the update notification to the external device when the area information stored in the storage unit is updated. By this, only when the area information stored in the storage unit is updated, a channel is preset.

On the other hand, a broadcast receiving device (e.g., a DVR) that receives a broadcast includes: an update notification receiving unit which receives, from an external device, an update notification of area information which is information indicating an area; an extraction unit which extracts the area information from the received update notification; and a presetting unit which presets a channel using the extracted area information. By this, when the update notification is received from an external device, it becomes possible to perform channel presetting using area information included in the update notification.

The area information is information indicating a zip code, an area code, or a prefecture code.

The invention can be implemented not only as such broadcast receiving devices but also as a broadcast receiving method that includes steps into which characteristic units included in such broadcast receiving devices are converted.

As described above, according to an aspect of the invention, even when a plurality of terrestrial digital broadcast receiving devices are possessed, there is no need to set area information each time a device is added. In addition, even when a plurality of terrestrial digital broadcast receiving devices are newly purchased or even when the place of residence of a user possessing a plurality of terrestrial digital broadcast receiving devices is changed due to moving or the like, there is no need to set area information on all the terrestrial digital broadcast receiving devices.

When area information can be thus set easily, it becomes possible to easily preset a channel and the like by using the set area information. Moreover, since there is no need to directly input area information or to select an appropriate area from a selection screen, an inconvenience such as setting wrong area information does not occur.

NUMERICAL REFERENCES

Figure 1:
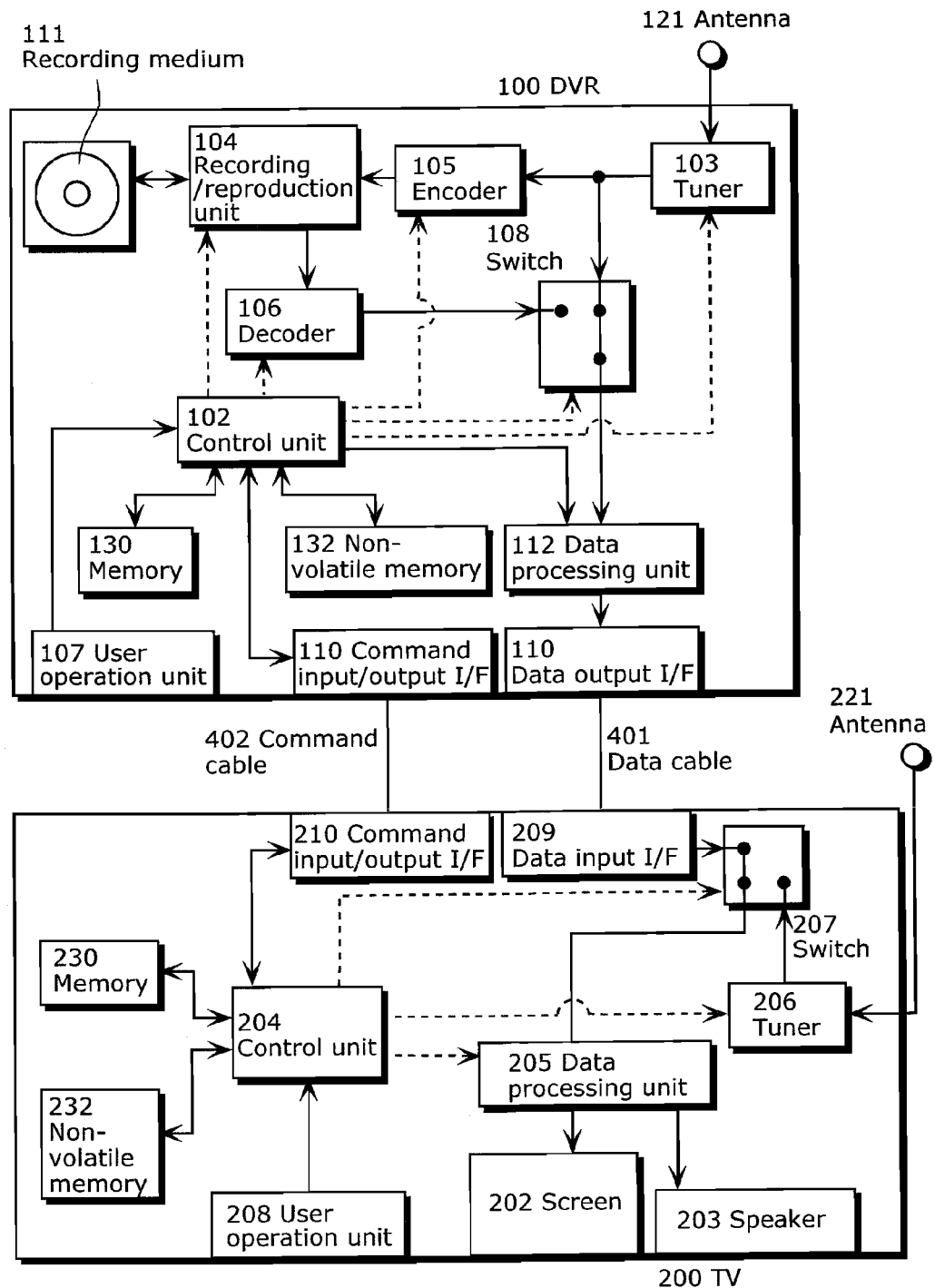
FIG. 1 is a diagram showing an exemplary configuration of an AV system in an embodiment.

100 DVR
102 Control unit
103 Tuner
104 Recording/reproduction unit
105 Encoder
106 Decoder
107 User operation unit
108 Switch
109 Data output I/F
110 Command input/output I/F
111 Recording medium
112 Data processing unit
121 Antenna
130 Memory
132 Non-volatile memory
200 TV
202 Screen
203 Speaker
204 Control unit
205 Data processing unit
206 Tuner
207 Switch
208 User operation unit
209 Data input I/F
210 Command input/output I/F
230 Memory
232 Non-volatile memory
401 Data cable
402 Command cable

DETAILED DESCRIPTION OF THE INVENTION

Hereinafter, the embodiments of the invention shall be described in detail with reference to the drawings.

(First Embodiment)

FIG. 1 is a diagram showing an exemplary configuration of an AV system in a first embodiment. As shown in the diagram, the AV system includes a DVR 100 and a TV 200.

A DVR 100 is a device that receives a terrestrial digital broadcast and has a control unit 102, a tuner 103, a recording/reproduction unit 104, an encoder 105, a decoder 106, a user operation unit 107, a switch 108, a data output I/F 109, a command input/output I/F 110, a recording medium 111, a data processing unit 112, an antenna 121, a memory 130, and a non-volatile memory 132. The control unit 102 controls an operation of each constituent unit of the DVR 100. The tuner 103 takes out video/audio data of a particular channel from a terrestrial digital broadcast received by the antenna 121. The recording/reproduction unit 104 reads and writes data on the recording medium 111. The encoder 105 converts video/audio data received from the tuner 103 into a format suitable for recording the data on the recording medium 111. The decoder 106 decodes the data recorded on the recording medium 111. The user operation unit 107 is a photoreceiver or the like that receives an instruction signal, such as an infrared signal, from operation buttons on a main body of the DVR 100 or from a remote controller operated by a user. The switch 108 selects either the tuner 103 or the decoder 106. The data output I/F 109 outputs the video/audio data to the TV 200 through a data cable 401. The command input/output I/F 110 performs input/output of a command with the TV 200 through a command cable 402. The recording medium 111 is a DVD-RAM disk or the like that can record data. The data processing unit 112 processes video/audio data when necessary and outputs the processed data to the data output I/F 109. The antenna 121 receives a terrestrial digital broadcast and outputs the terrestrial digital broadcast to the tuner 103. The memory 130 is a volatile memory that temporarily stores data. The non-volatile memory 132 is a non-volatile memory that stores setting information such as area information. The area information is, as already described, information indicating an area, such as a zip code, a prefecture, or an area code.

The TV 200 is a device that receives a terrestrial digital broadcast and has a screen 202, a speaker 203, a control unit 204, a data processing unit 205, a tuner 206, a switch 207, a user operation unit 208, a data input I/F 209, a command input/output I/F 210, and an antenna 221. The control unit 204 controls the operation of each constituent unit of the TV 200. The data processing unit 205 processes video/audio data when necessary and outputs the processed data to the screen 202 or the speaker 203. The tuner 206 takes out video/audio data of a particular channel from a terrestrial digital broadcast received by the antenna 221. The switch 207 selects either the data input I/F 209 or the tuner 206. The user operation unit 208 is a photoreceiver or the like that receives an instruction signal, such as an infrared signal, from operation buttons on a main body of the TV 200 or from a remote controller operated by the user. The data input I/F 209 accepts, as input, video/audio data from the DVR 100 through the data cable 401. The command input/output I/F 210 performs input/output of a command with the DVR 100 through the command cable 402. The antenna 221 receives a terrestrial digital broadcast and outputs the terrestrial digital broadcast to the tuner 206.

The DVR 100 is connected to the TV 200 by the data cable 401 and the command cable 402. The data cable 401 is a D-terminal cable, an S-terminal cable, an RCA cable, a DVI cable, or the like, for transmitting video/audio data. The command cable 402 is an RS232C serial cable or the like for transmitting a command.

The operation of the AV system in the first embodiment shall be described below. Here, it is assumed that a newly purchased DVR 100 is connected to (newly installed on) an existing TV 200. That is, area information has already been stored in the non-volatile memory 232 of the TV 200 and a channel presetting according to the area information has been completed. On the other hand, area information is not stored in the non-volatile memory 132 of the DVR 100 and a channel presetting has not been completed.

(Operation of the DVR)

Figure 2:
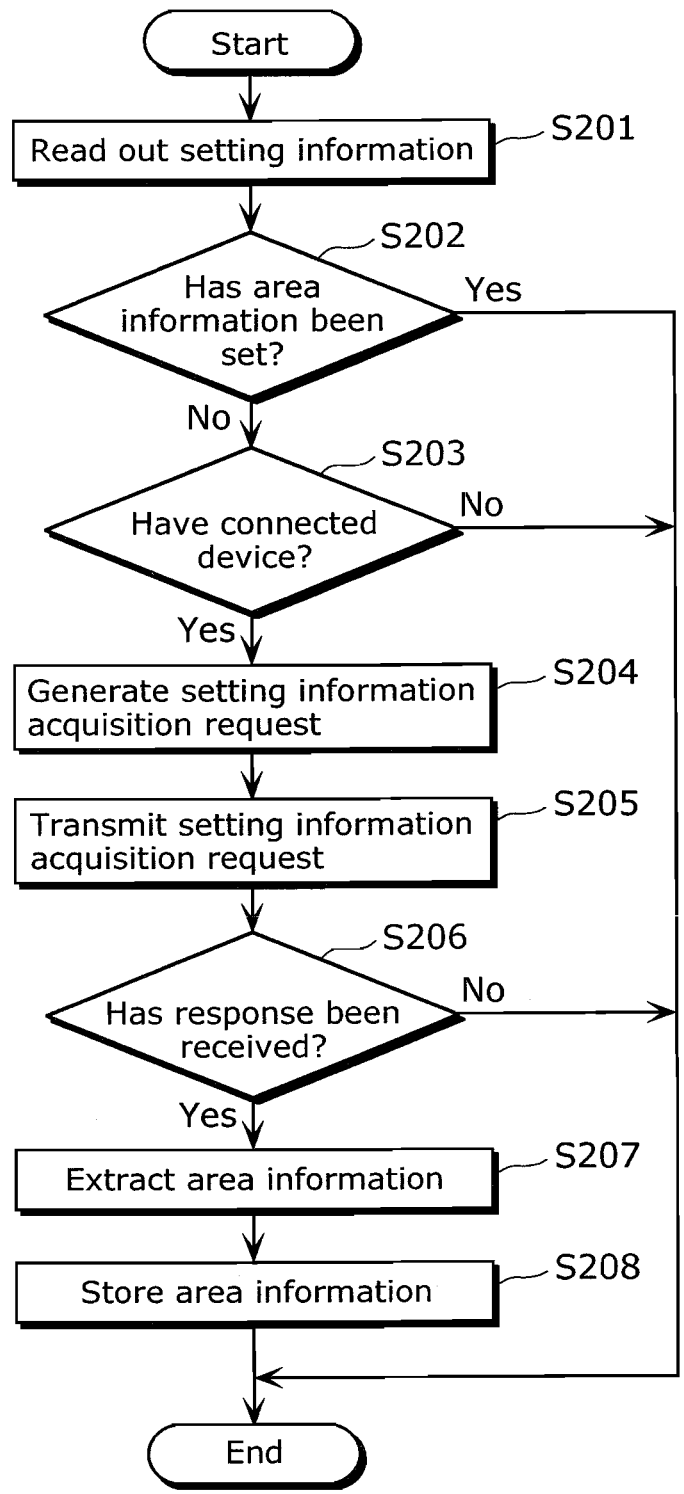
FIG. 2 is a flowchart showing an operation of a DVR in a first embodiment.

FIG. 2 is a flowchart showing the operation of the DVR 100 in the first embodiment.

The user can input various instructions, such as "initial setting", "start playback", "stop playback", "display menu", and "close menu", to the user operation unit 107. When the user operation unit 107 receives an instruction from the user, the user operation unit 107 notifies the control unit 102 of the instruction.

When there is an instruction of "initial setting" from the user, the control unit 102 reads a predetermined region of the non-volatile memory 132 (S201) and determines whether area information has been set (S202). Here, since it is assumed that area information has not been stored in the non-volatile memory 132 of the DVR 100, the determination in step S202 is No.

If area information has already been set (Yes in step S202), the control unit 102 then instructs the data processing unit 112 to generate a menu screen showing the determination result. The data processing unit 112 generates data on the instructed menu screen and outputs to the data output I/F 109 the generated data on the menu screen, instead of the video/audio data to be received from the switch 108. The outputted data on the menu screen is displayed on the screen 202 of the TV 200 through the data cable 401.

Figure 3:
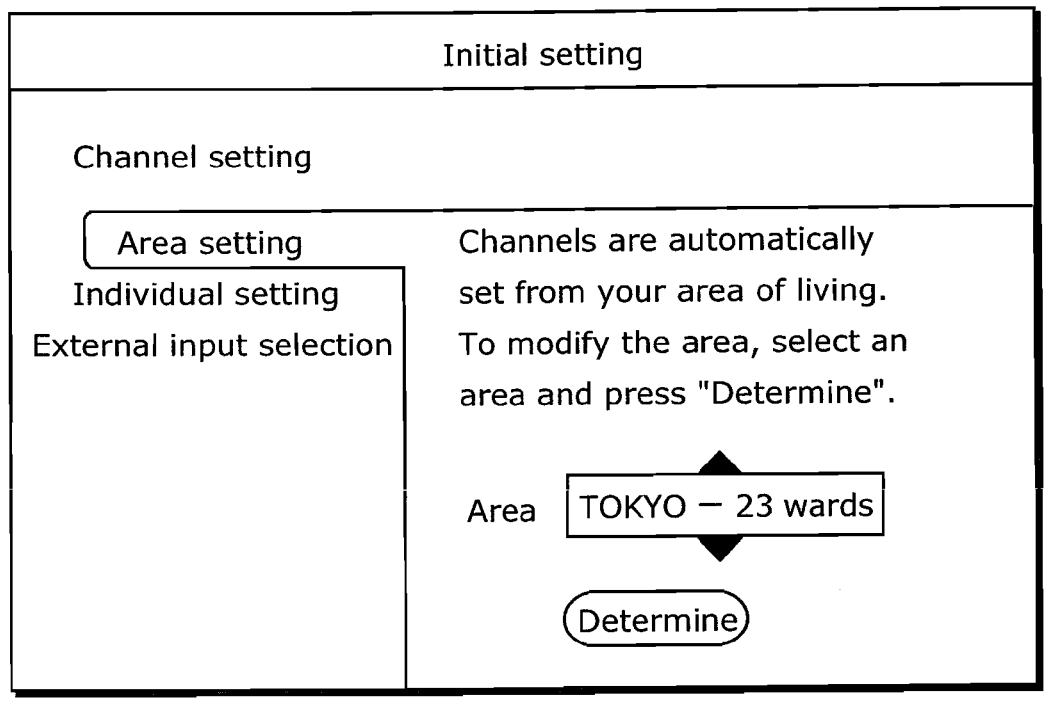
FIG. 3 is a diagram showing exemplary display on a screen of a TV.

FIG. 3 is a diagram showing an example of a display on the screen 202 of the TV 200. As shown in the diagram, when area information indicating "Tokyo 23 wards", for example, is set, a screen on which Tokyo 23 wards is being selected is displayed on the TV 200 with the message of "Channels are automatically set from your living area. To modify the area, select an area and press "Determine"." If the selected area "Tokyo 23 wards" is not appropriate, the area can be modified to an appropriate area by providing an instruction to the user operation unit 107.

On the other hand, if the control unit 102 determines that area information has not been set (No in S202), the control unit 102 then determines, through the command output I/F, whether there is a device connected to the DVR 100 (S203). Here, since the TV 200 is connected to the DVR 100 (Yes in S204), it is determined that there is a device connected to the DVR 100.

Then, the control unit 102 generates a setting information acquisition request (S204) and transmits the generated setting information acquisition request to the TV 200 through the command output I/F 110 and the command cable 402 (S205). If a response to the setting information acquisition request is received within a predetermined period of time after the setting information acquisition request is transmitted (Yes in S206), area information such as a zip code, an area code, or a prefecture code is extracted from a data portion of the response (S207).

Figure 4:
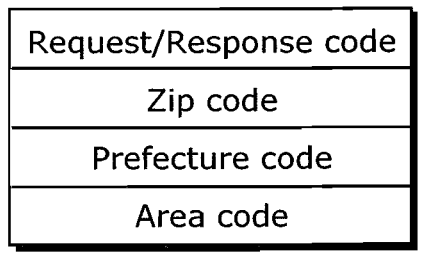
FIG. 4 is a diagram showing an exemplary internal configuration of a response to a setting information acquisition request.

FIG. 4 is a diagram showing an example of an internal configuration of the response to the setting information acquisition request. As shown in the diagram, the data portion of the response to the setting information acquisition request includes area information such as a zip code, an area code, and a prefecture code. When the control unit 102 properly extracts area information from the data portion of the response, the control unit 102 then stores the extracted area information in the non-volatile memory 132 (S208). When the storing of the area information is completed, the tuner 102 is controlled to perform a channel presetting. When the channel presetting is completed, presetting information is stored in the non-volatile memory 132.

It is to be understood, however, that timing at which channel presetting is performed is not limited to timing at which storing of area information is completed. For example, when storing of area information is completed, the screen, as shown in FIG. 3, inquiring whether a modification needs to be made to the area information may be displayed on the TV 200 and channel presetting may be performed when the determination button included on the screen is pressed.

(Operation of TV)

Figure 5:
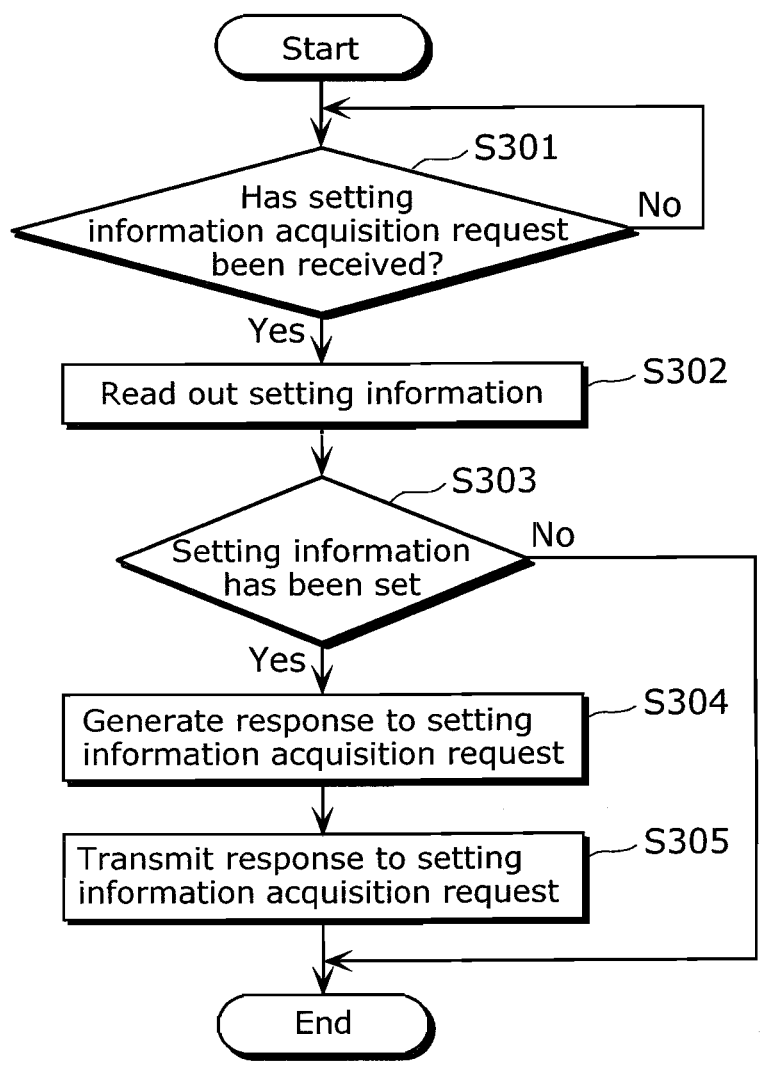
FIG. 5 is a flowchart showing an operation of the TV in the first embodiment.

FIG. 5 is a flowchart showing the operation of the TV 200 in the first embodiment.

At the time of "initial setting" of the DVR 100, the control unit 204 of the TV 200 sets the switch 207 to the data input I/F side that accepts, as an input, a data output from the DVR 100. By this, it becomes possible to output, to the screen 202, a menu screen or the like from the DVR 100.

When receiving a setting information acquisition request from the DVR 100 (Yes in S301), the control unit 204 of the TV 200 reads a predetermined region of the non-volatile memory 232 (S302) and determines whether area information has been stored. If it is determined that area information has been set (Yes in S303), a response to the setting information acquisition request from the DVR 100 is generated (S304) and the generated response is transmitted to the DVR 100 through the command output I/F 210 and the command cable 402 (S305).

(Command Sequence)

Figure 6:
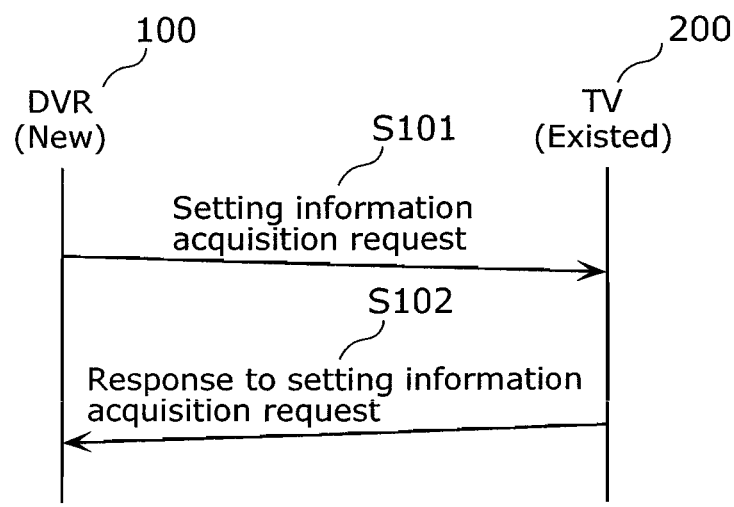
FIG. 6 is a diagram showing a communication sequence of an AV system in the first embodiment.

FIG. 6 is a diagram showing a communication sequence of the AV system in the first embodiment. As already described, when a DVR 100 is newly installed on an existing TV 200, a setting information acquisition request is transmitted to the TV 200 from the DVR 100 (S101) and thereafter a response to the setting information acquisition request is transmitted to the DVR 100 from the TV 200 (S102).

As described above, according to the first embodiment, when a DVR 100 is newly installed on the existing TV 200, area information set on the TV 200 is automatically reflected on the DVR 100. By this, even when a plurality of terrestrial digital broadcast receiving devices are possessed, there is no need to set area information each time a new device is added. When area information can be thus set easily, it becomes possible to easily perform channel presetting and the like by using the set area information. Moreover, since there is no need to directly input area information or to select an appropriate area from a selection screen, an inconvenience such as setting wrong area information does not occur.

Although, in the first embodiment, only when area information is not set in the non-volatile memory 132 of the DVR 100, a setting information acquisition request is transmitted to the TV 200 from the DVR 100, the invention is not limited thereto. Specifically, even when area information is set in the non-volatile memory 132 of the DVR 100, if a user has instructed, through the user operation unit 107, to update the setting information, a setting information acquisition request may be transmitted to the TV 200 from the DVR 100. Such a function can be implemented by the controller unit 102 determining, at step S202 in FIG. 2, whether there is an update instruction from the user.

By this, if the place of residence is changed due to moving, for example, even in the case where area information has already been stored in the non-volatile memory 132 of the DVR 100, area information can be easily set. Specifically, by updating only area information on the TV 100 and providing an update instruction from a menu screen generated by each of the second and later devices, such as DVRs 100, the updated area information set on the TV 200 is automatically reflected on the second and later devices. As a result, it is obvious that channel presetting and the like can be easily performed.

Although, in the first embodiment, the DVR 100 is connected to the TV 200 by two cables, i.e., the data cable 401 and the command cable 402, the invention is not limited thereto. For example, data and a command may be transmitted by a single cable using a LAN (Local Area Network) cable or an IEEE 1394 cable, for example.

Figure 7:
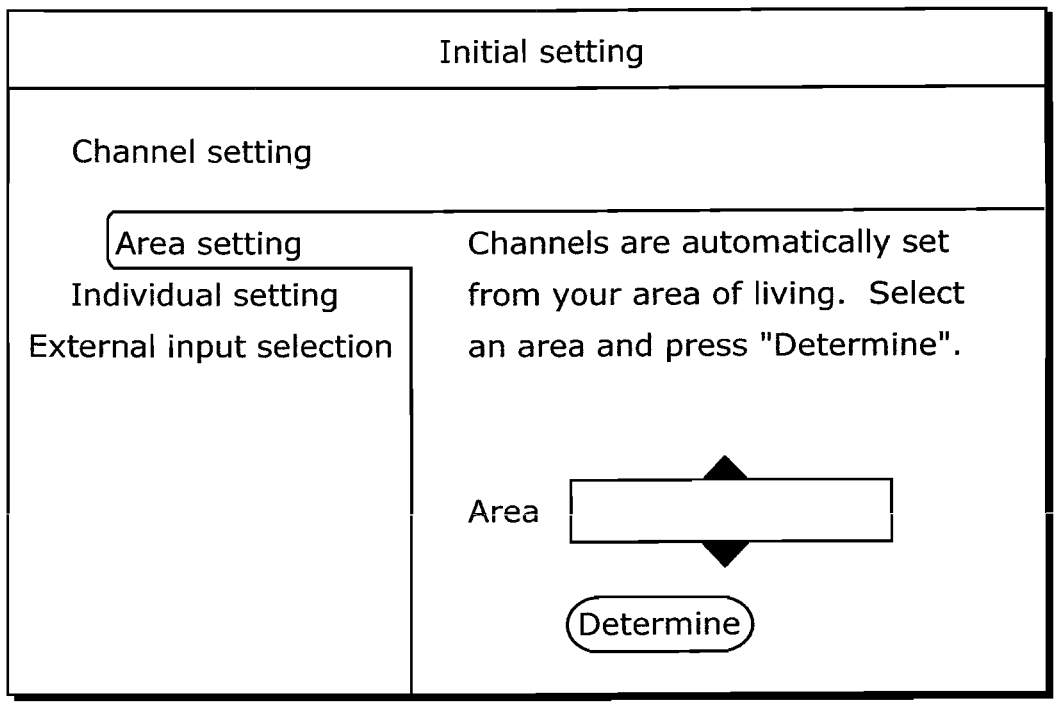
FIG. 7 is a diagram showing exemplary display on the screen of the TV.

Although, in the first embodiment, the description is made assuming that area information has been set on the TV 200, if area information has not been set on the TV 200, the TV 200 may transmits to the DVR 100 a response indicating the determination result. In this case, as with conventional cases, a user is allowed to directly input area information or to select an appropriate area from a selection screen, and thus, as shown in FIG. 7, a screen is displayed on the TV 200, including a message of "Channels are automatically set from your living area. Select an area and press "Determine"." By doing so, even in the case where area information has not been set on the TV 200, the user can continue an initial setting operation without feeling uncomfortable.

Although, in the first embodiment, the description is made exemplifying area information, the type of information is not limited to the area information. That is, as long as setting information used between a plurality of devices in a shared manner is handled, the same effects as those described above can be obtained.

Although, in the first embodiment, a setting information acquisition request is transmitted to the TV 200 from the DVR 100 and a response to the request is transmitted to the DVR 100 from the TV 200, in contrast, a setting information acquisition request may be transmitted to the DVR 100 from the TV 200 and a response to the request may be transmitted to the TV 200 from the DVR 100. Alternatively, when not only the DVR 100 but also a broadcast receiving device, such as a set-top box, are connected to the TV 200, a setting information acquisition request from the DVR 100 may be transmitted to both devices, i.e., the TV 200 and the set-top box. In this case, when area information is not set on the TV 200, it is preferable that area information set on the set-top box be transmitted to the DVR 100.

(Second Embodiment)

The above-described first embodiment exemplifies the case in which a DVR 100 is newly installed on an existing TV 200. In a second embodiment, it is assumed that both a DVR 100 and a TV 200 have just newly purchased. Namely, neither a non-volatile memory 232 of the TV 200 nor a non-volatile memory 132 of the DVR 100 stores area information therein and neither of the devices has completed presetting a channel.

The operation of an AV system in the second embodiment shall be described below assuming the case in which area information is newly set from an initial setting menu on the TV 200. Note that in the following description a detailed description of the same parts as those of the above-described first embodiment will be omitted.

(Operation of TV)

Figure 8:
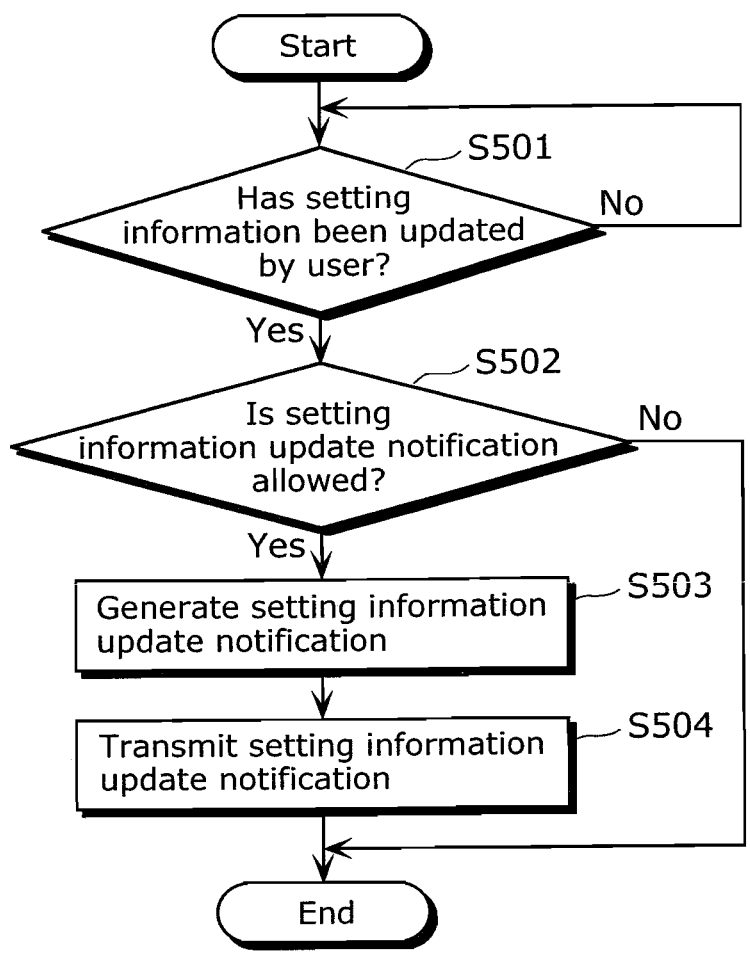
FIG. 8 is a flowchart showing an operation of a TV in a second embodiment.

FIG. 8 is a flowchart showing the operation of the TV 200 in the second embodiment.

When area information is newly set from an initial setting menu on the TV 200 (Yes in S501), a control unit 204 sets the area information in the non-volatile memory 232 and reads notification allowance/non-allowance information from a predetermined region of the non-volatile memory 232. The notification allowance/non-allowance information is information indicating, when there is an update to setting information by a user, whether to allow notification of the update to be transmitted to an external device.

If notification to the external device is allowed (Yes in S502), then the control unit 204 generates setting information update notification (S503) and transmits the generated setting information update notification to the DVR 100 through a command input/output I/F 210 and a command cable 402 (S504). Thereafter, a tuner 206 is controlled to perform channel presetting. When the channel is completely preset, presetting information is stored in the non-volatile memory 232.

(Operation of the DVR)

Figure 9:
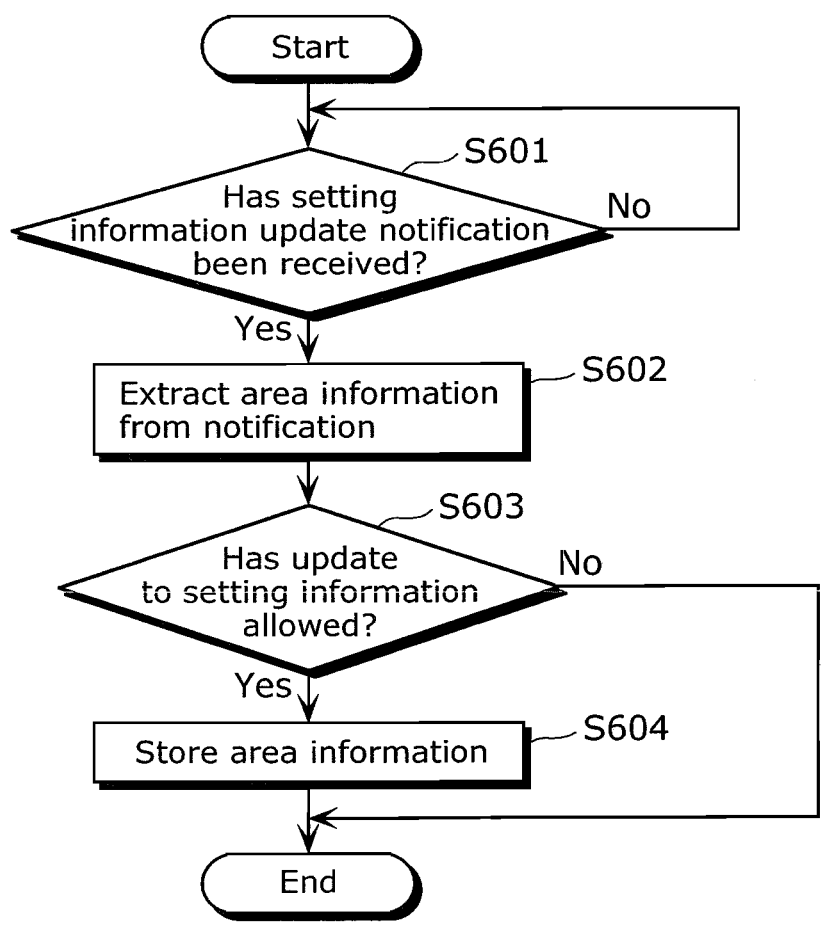
FIG. 9 is a flowchart showing an operation of a DVR in the second embodiment.

FIG. 9 is a flowchart showing the operation of the DVR 100 in the second embodiment.

When a control unit 102 of the DVR 100 receives, in a state in which area information is not stored in the non-volatile memory 132, setting information update notification from the TV 100 through a command input/output I/F 110 (Yes in S601), the control unit 102 extracts area information, such as a zip code, an area code, or a prefecture code, from a data portion of the setting information update notification (S602).

FIG. 4 is a diagram showing an example of an internal configuration of the setting information update notification. The internal configuration of the setting information update notification is the same as that of a response to a setting information acquisition request referred to in the above-described first embodiment and thus a description thereof will be omitted here. When properly extracting the area information from the data portion of the update notification, the control unit 102 reads automatic update allowance/non-allowance information from a predetermined region of the non-volatile memory 132. The automatic update allowance/non-allowance information is information indicating whether an automatic update to setting information is allowed.

In the case where an automatic update to setting information is allowed (Yes in S603), the control unit 102 then stores the extracted area information in a predetermined region of the non-volatile memory 132 (S604). When the area information is completely stored, the control unit 102 causes a tuner 206 to perform channel presetting. When the channel is completely preset, the control unit 102 causes the non-volatile memory 132 to store presetting information.

(Command Sequence)

Figure 10:
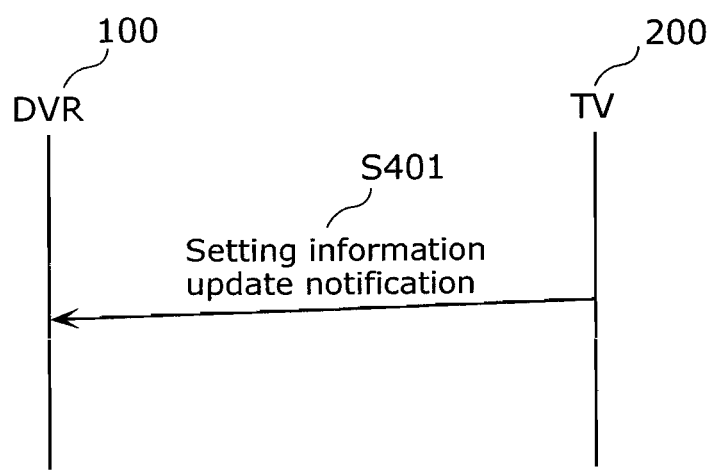
FIG. 10 is a diagram showing a communication sequence of an AV system in the second embodiment.

FIG. 10 is a diagram showing a communication sequence of the AV system in the second embodiment. As already described, when area information is newly set from an initial setting menu on the TV 200, setting information update notification is transmitted to the DVR 100 from the TV 200 (S401).

As described above, according to the second embodiment, when area information is newly set on one device, the area information is automatically reflected on another device. By this, even when a plurality of terrestrial digital broadcast receiving devices are newly purchased or even when the place of residence of a user possessing a plurality of terrestrial digital broadcast receiving devices is changed due to moving or the like, there is no need to set area information on all the terrestrial digital broadcast receiving devices. When area information can be thus set easily, it becomes possible to easily perform channel presetting and the like using the set area information. Moreover, since there is no need to directly input area information or to select an appropriate area from a selection screen, an inconvenience such as setting wrong area information does not occur.

Although, in the second embodiment, the TV 100 transmits setting information update notification to the DVR 100 based on notification allowance/non-allowance information stored in the non-volatile memory 232 of the TV 200, the invention is not limited thereto. For example, when the TV 200 always transmits setting information update notification to the DVR 100, notification allowance/non-allowance information does not need to be stored in the non-volatile memory 232.

Although, in the second embodiment, the DVR 100 determines, based on automatic update allowance/non-allowance information stored in the non-volatile memory 132 of the DVR 100, whether to allow updated information received from the TV 100 to be reflected, the invention is not limited thereto. For example, when the DVR 100 always reflects updated information received from the TV 100, automatic update allowance/non-allowance information does not need to be stored in the non-volatile memory 132.

Alternatively, when the DVR 100 receives setting information update notification from the TV 200, the control unit 102 of the DVR 100 may instruct the data processing unit 112 to generate a menu screen showing such a fact. The data processing unit 112 generates data on the instructed menu screen and allows the data output I/F 109 to output the generated data on the menu screen, instead of video/audio data to be received from the switch 108. By this, when a user provides, through the user operation unit 107, an update allowance to a menu displayed on the screen 202 of the TV 200, setting information may be updated.

Note that the control unit 102 of the DVR 100 referred to in the first or second embodiment is an example of a request transmission unit, a response receiving unit, an extraction unit, a presetting unit, and an update notification receiving unit according to and aspect of the invention. Furthermore, the control unit 204 of the TV 200 referred to in the first or second embodiment is an example of a request receiving unit, a response transmission unit, and an update notification transmission unit according to an aspect of the invention.

Industrial Applicability

The broadcast receiving devices according to an aspect of the invention can be applied to DVRs, TVs, and the like, that require easy setting of area information.

The invention claimed is:

1. A broadcast receiving device that receives a broadcast, said device comprising:
 a request transmission unit operable to automatically transmit, to a plurality of external devices each connected to said broadcast receiving device and including a tuner for receiving the broadcast, an acquisition request for area information which is information indicating an area, the plurality of external devices being broadcast receiving devices other than said broadcast receiving device;
 a response receiving unit operable to receive a response to the acquisition request from at least one of the plurality of external devices;
 an extraction unit operable to extract from the received response the area information, the area information being used for presetting a channel by the at least one of the plurality of external devices which has transmitted the response;
 a presetting unit operable to preset a channel using the extracted area information; and
 a storage unit operable to store the extracted area information, when the area information is extracted by said extraction unit,
 wherein said request transmission unit is operable to automatically transmit the acquisition request to the plurality of external devices when the area information is not stored in said storage unit.

2. The broadcast receiving device according to claim 1, wherein said request transmission unit is further operable to transmit the acquisition request to the plurality of external devices when an update to the area information is instructed by a user.

3. The broadcast receiving device according to claim 1, said device further comprising
 an update notification transmission unit operable to transmit, as an update notification of the area information, the area information stored in said storage unit to at least one of the plurality of external devices.

4. The broadcast receiving device according to claim ,
wherein said update notification transmission unit is operable to transmit the update notification to at least one of the plurality of external devices when the area information stored in said storage unit is updated.

5. The broadcast receiving device that receives a broadcast according to claim 1, said device further comprising
 an update notification receiving unit operable to receive, from at least one of the plurality of external devices, an update notification of the area information which is the information indicating the area,
 wherein the extraction unit is operable to extract the area information from the received update notification; and
 the presetting unit is operable to preset a channel using the area information extracted from the received update notification.

6. The broadcast receiving device according to claim 1, wherein the area information is information indicating a zip code, an area code, or a prefecture code.

7. A broadcast receiving device that receives a broadcast, said device comprising:
 a storage unit operable to store area information which is information indicating an area;
 a request receiving unit operable to receive an acquisition request for the area information from at least one of a plurality of external devices each connected to said broadcast receiving device and including a tuner for receiving the broadcast, the external devices being broadcast receiving devices other than said broadcast receiving device;
 a response transmission unit operable to automatically transmit, to the at least one of the external devices that has transmitted the acquisition request, the area information as a response to the acquisition request, when the area information is stored in said storage unit, the area information stored being used for presetting a channel by said broadcast receiving device; and
 a transfer instruction transmission unit operable to transmit an instruction to transfer the area information, to at least one of the plurality of external devices which is not the transmission source of the acquisition request, the instruction being transmitted when the area information is not stored in said storage unit.

8. The broadcast receiving device according to claim 7, wherein the area information is information indicating a zip code, an area code, or a prefecture code.

9. A broadcast receiving system comprising
 a first broadcast receiving device including a tuner for receiving a broadcast, a second broadcast receiving device including a tuner for receiving a broadcast, and a third broadcast receiving device including a tuner for receiving a broadcast, wherein said first broadcast receiving device includes:
a request transmission unit operable to automatically transmit, to said second broadcast receiving device and said third broadcast receiving device, an acquisition request for area information which is information indicating an area;
a response receiving unit operable to receive a response to the acquisition request from at least one of said second broadcast receiving device and said third broadcast receiving device;
an extraction unit operable to extract the area information from the received response; and
a presetting unit operable to preset a channel using the extracted area information, and
wherein said second broadcast receiving device includes:
a storage unit operable to store area information;
a request receiving unit operable to receive the acquisition request for the area information from said first broadcast receiving device;
a response transmission unit operable to automatically transmit, as a response to the acquisition request, the area information stored in said storage unit to said first broadcast receiving device; and
a transfer instruction transmission unit operable to transmit, to said third broadcast receiving device, an instruction to transfer the area information, when the area information is not stored in the storage unit of said second broadcast device, and
wherein said third broadcast receiving device includes:
a storage unit operable to store the area information;
an instruction receiving unit operable to receive an instruction to transfer the area information from said second broadcast receiving device; and
a response transmission unit operable to transmit, to said first broadcast receiving device, the area information as a response to the acquisition request when the area information is stored in said storage unit of said third broadcasting device.

10. The broadcast receiving system according to claim 9, wherein the area information is information indicating a zip code, an area code, or a prefecture code.

11. The broadcast receiving system according to claim 9, wherein said first broadcast receiving device is a Digital Video Recorder;
said second broadcast receiving device is a Television; and
said third broadcast receiving device is a Set Top Box.

12. The broadcast receiving system according to claim 9, wherein said first broadcast receiving device further comprises:
a storage unit operable to store the area information which is the information indicating the area; and
an update notification transmission unit operable to transmit, as an update notification of the area information, the area information stored in said storage unit of said first broadcast receiving device to said second broadcast receiving device,
wherein said second broadcast receiving device further comprises:
an update notification receiving unit operable to receive, from said first broadcast receiving device, the update notification of the area information which is the information indicating the area;
an extraction unit operable to extract the area information from the received update notification; and
a presetting unit operable to preset a channel using the extracted area information, and wherein said third broadcast receiving device further comprises:
an update notification receiving unit operable to receive, from said first broadcast receiving device, the update notification of the area information which is the information indicating the area;
an extraction unit operable to extract the area information from the received update notification; and
a presetting unit operable to preset a channel using the extracted area information.

13. The broadcast receiving system according to claim 12, wherein said first broadcast receiving device is a Digital Video Recorder;
said second broadcast receiving device is a Television; and
said third broadcast receiving device is a Set Top Box.

14. A broadcast receiving method, being performed by a broadcast receiving device, for receiving a broadcast, said method comprising:
automatically transmitting, to a plurality of external devices each connected to said broadcast receiving device and including a tuner for receiving the broadcast, an acquisition request for area information which is information indicating an area, the acquisition request being automatically transmitted to the plurality of external devices when the area information is not stored in a storage unit of the broadcast receiving device, the plurality of external devices being broadcast receiving devices other than said broadcast receiving device;
receiving a response to the acquisition request from at least one of the plurality of external devices;
extracting the area information from the received response, the area information being used for presetting a channel by the at least one of the plurality of external devices which has transmitted the response;
presetting a channel using the extracted area information; and
storing the extracted area information in the storage unit of the broadcast receiving device.

15. The broadcast receiving method for receiving a broadcast according to claim 14, said method further comprising
transmitting, as an update notification of the area information, the area information stored in said storing to at least one of the plurality of external devices.

16. The broadcast receiving method for receiving a broadcast according to claim 14, said method comprising:
receiving, from at least one of the plurality of external devices, an update notification of the area information which is the information indicating the area;
extracting the area information from the received update notification; and
presetting a channel using the area information extracted from the received update notification.

17. The broadcast receiving method to claim 14, wherein the area information is information indicating a zip code, an area code, or a prefecture code.

18. A broadcast receiving method, performed by a broadcast receiving device, for receiving a broadcast, said method comprising:
storing area information which is information indicating an area;
receiving an acquisition request for the area information from at least one of a plurality of external devices each connected to said broadcast receiving device and including a tuner for receiving the broadcast, the external devices being broadcast receiving devices other than said broadcast receiving device;

automatically transmitting, to the at least one of the external devices that has transmitted the acquisition request, the area information as a response to the acquisition request, the area information stored in said storing being used for presetting a channel by the broadcast receiving device; and transmitting an instruction to transfer the area information, to at least one of the plurality of external devices which is not the transmission source of the acquisition request when the area information is not stored.

19. The broadcast receiving method to claim 18,
wherein the area information is information indicating a zip code, an area code, or a prefecture code.

* * * * *